J. P. HOLMES.
WRENCH.
APPLICATION FILED MAY 2, 1914.
1,166,589. Patented Jan. 4, 1916.
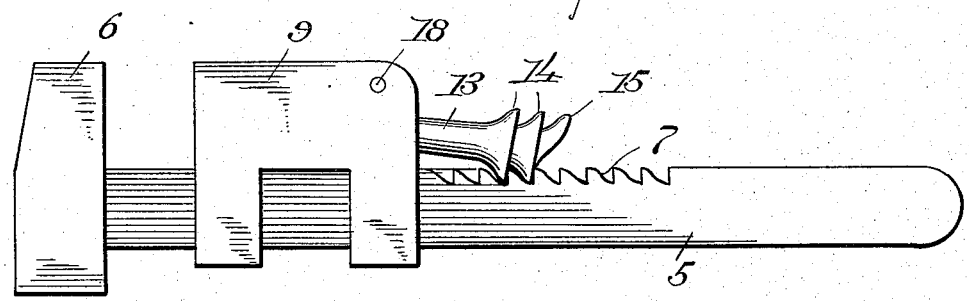
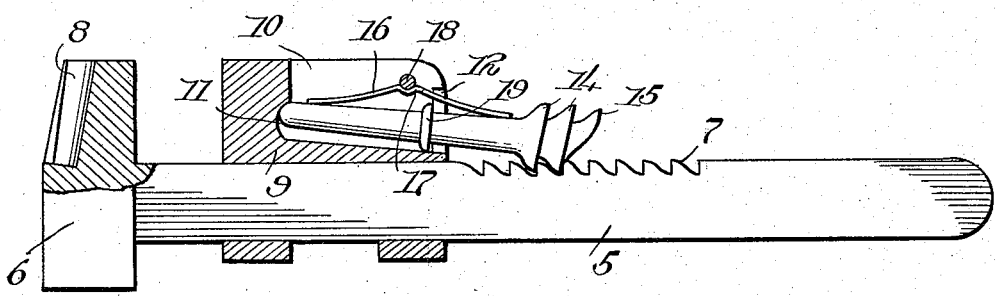
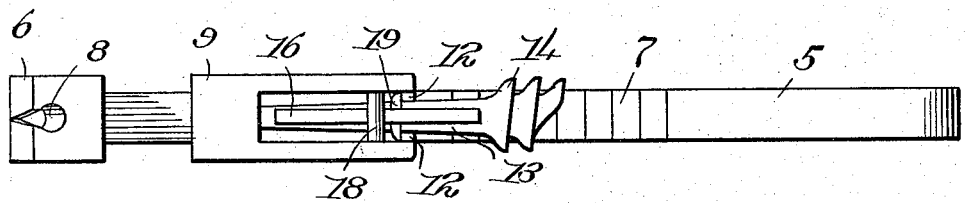
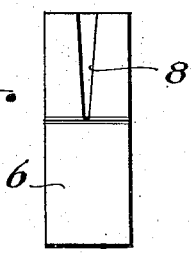
Witnesses
Inventor
Joseph P. Holmes,
By Richard B. Owen.
Attorney

UNITED STATES PATENT OFFICE.

JOSEPH P. HOLMES, OF CASPER, WYOMING.

WRENCH.

1,166,589.  Specification of Letters Patent.  Patented Jan. 4, 1916.

Application filed May 2, 1914. Serial No. 835,992.

*To all whom it may concern:*

Be it known that I, JOSEPH P. HOLMES, a citizen of the United States, residing at Casper, in the county of Natrona and State of Wyoming, have invented certain new and useful Improvements in Wrenches, of which the following is a specification.

This invention relates to wrenches having primarily for its object to provide a quickly adjustable jaw, although the same may be gradually slid on the wrench shank if so desired.

Another object of the invention is to provide a wrench of comparatively few parts which are durable, effective in the performance of their respective functions, at the same time, inexpensive to manufacture.

Other objects as well as the nature, characteristic features and scope of my invention will be more readily understood from the following description taken in connection with the accompanying drawings and pointed out in the claim forming a part of this specification.

Referring to the drawings: Figure 1 is a side elevation of a wrench constructed in accordance with my invention. Fig. 2 is a similar view, a part thereof being broken away to disclose details. Fig. 3 is a front elevation of the same, and Fig. 4 is a top plan view thereof.

In the drawings wherein is illustrated the preferred embodiment of this invention, a wrench shank 5 is provided on one end of which is formed a rigid outer jaw 6, the shank being provided with a rack 7, the teeth of which are beveled on one side and abrupt on the other. The rigid jaw 6 is provided with an opening 8 therein to provide a claw for extracting nails or the like.

A movable jaw 9 is mounted on the shank 5, said jaw in the present instance comprising a frame having a portion thereof cut-out to provide a recess 10 which opens out to the front face of the jaw, a circular depression 11 communicating with the opening or recess 10, while parallel flanges 12 are formed on the opposite inner faces of the walls of the recess. A spindle 13 is rotatably mounted in the inner jaw 9, one end thereof being rounded for engagement in the recess 11 and being of a diameter slightly less than that of the recess, in order to permit lateral movement of the spindle 13, for a purpose which will subsequently appear. The lower or inner end of the spindle 13 is enlarged and has threads 14 formed on the outer periphery thereof, each of which has one face thereof beveled and the opposite face abrupt, conforming to the contour of the rack 7, a portion of the lowermost thread being removed to provide a tooth 15, in order to facilitate the actuation of the jaw 9, when a quick adjustment is desired.

In order to normally hold the threads 14 of the spindle 13 in engagement with the rack 7, an elastic element 16 is provided which in the present instance, comprises a flat spring, the opposite ends of which are in engagement with the spindle, while a portion midway the ends of said spring is depressed, as indicated at 17 and shown to advantage in Fig. 2, to permit of pivotal movement of the spring on a stud 18, the latter extending transversely of the jaw 9 in the recess 10, providing an axis upon which the spindle 13 is actuated. When it is desired to expedite the actuation of said jaw in either direction on the wrench shank, pressure is exerted on the finger 16 in a direction away from the shank 5, causing the threads 14 to be disengaged from the teeth 7 and permitting the inner jaw 9 to be slid on the shank 5 in either direction. To prevent displacement of the spindle 13 from the jaw 9, an annular flange 19 is formed approximately midway the ends of said spindle and on the outer periphery thereof, which engages with the flanges 12, permitting of the lateral movement of the spindle as previously pointed out, at the same time, preventing longitudinal movement independent of the jaw 9.

In operation, assuming that it is desired to actuate the jaw 9 toward the jaw 6, pressure is exerted on the tooth 15, thereby causing the jaw 9 to be readily moved on the shank 5. If only a gradual threaded advancement of the jaw 9 is desired, the spindle 13 may be rotated, allowing the threads 14 to mesh with the rack 7. In retracting the jaw 9 from the jaw 6, the spindle 13 is rotated in the opposite direction, causing the jaw 9 to be moved. When it is desired to rapidly retract the jaw, the threads 14 are disengaged from the rack 7 by exerting pressure on the tooth 15 causing the threads 14 to be disengaged and permitting the jaw 9 to freely slide on the shank 5, the threads 14 being automatically reëngaged with the rack 7, as soon as pressure is released from the tooth 15 in view of the elastic element 16.

It will be understood that the above description and accompanying drawings comprehend only the general and preferred embodiment of my invention and that various minor changes in details of construction, proportion and arrangement of parts may be made within the scope of the appended claim and without sacrificing any of the advantages of my invention.

Having thus fully described my invention, what I claim as new and desire to secure by Letters Patent is:

A wrench including a shank, a portion of which is provided with teeth, an outer jaw, integral with the shank, an inner jaw, slidably mounted on the shank and having a slot opening on the front and inner faces of the jaw, a circular depression formed in the end wall of said slot, the bottom wall of the slot being inclined toward the inner face of the jaw, parallel flanges on the opposite inner faces of the walls of the slot, a spindle mounted in said slot, the inner end thereof provided with teeth to engage the teeth on the shank, and the opposite end engaged in the recess, a flange intermediate its ends engaging with the parallel flanges and acting as a pivot for the spindle, a bar extending across the slot, and a spring passing under the bar and bearing against the front side of the spindle to normally hold the teeth thereon in engagement with the teeth on the shank.

In testimony whereof I affix my signature in presence of two witnesses.

JOSEPH P. HOLMES.

Witnesses:
F. H. SAWYER,
R. H. NICHOLS.

Copies of this patent may be obtained for five cents each, by addressing the "Commissioner of Patents, Washington, D. C."